United States Patent
Li et al.

(10) Patent No.: US 12,117,703 B2
(45) Date of Patent: Oct. 15, 2024

(54) DISPLAY PANEL AND DISPLAY DEVICE COMPRISING THE SAME

(71) Applicant: HKC CORPORATION LIMITED, Shenzhen (CN)

(72) Inventors: Rong Li, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/495,820

(22) Filed: Oct. 27, 2023

(65) Prior Publication Data
US 2024/0295782 A1   Sep. 5, 2024

(30) Foreign Application Priority Data
Mar. 2, 2023   (CN) .......................... 202310191318.1

(51) Int. Cl.
*G02F 1/1362* (2006.01)
*G02F 1/136* (2006.01)
*G09G 3/36* (2006.01)

(52) U.S. Cl.
CPC .... *G02F 1/136222* (2021.01); *G02F 1/13606* (2021.01); *G02F 1/136213* (2013.01); *G02F 1/136286* (2013.01); *G02F 2201/52* (2013.01); *G09G 3/3614* (2013.01)

(58) Field of Classification Search
CPC ........... G02F 1/136222; G02F 1/13606; G02F 1/136213; G02F 1/136286; G02F 2201/52
See application file for complete search history.

(56) References Cited

U.S. PATENT DOCUMENTS

| | | | | |
|---|---|---|---|---|
| 2010/0033644 A1* | 2/2010 | Hong | ................ | G02F 1/136259 349/48 |
| 2016/0070149 A1* | 3/2016 | Hirosawa | .......... | G02F 1/136227 349/123 |
| 2019/0206897 A1* | 7/2019 | He | ........................ | H01L 27/124 |

FOREIGN PATENT DOCUMENTS

| | | |
|---|---|---|
| CN | 101334564 A | 12/2008 |
| CN | 102636927 A | 8/2012 |
| CN | 106094381 A | 11/2016 |

* cited by examiner

*Primary Examiner* — Paisley L Wilson
(74) *Attorney, Agent, or Firm* — Maier & Maier, PLLC

(57) ABSTRACT

A display panel and display device. The display panel includes an array substrate, liquid crystal layers and a color film substrate; the array substrate includes multiple columns of first data lines, multiple rows of first scan lines, a first pixel array and multiple columns of first common electrode lines; the color film substrate includes multiple columns of second data lines, multiple rows of second scan lines, a second pixel array and multiple columns of second common electrode lines; by arranging the pixel units, the data lines, the scan lines and the common electrode lines respectively and alternatingly on the array substrate and on the color film substrate, the common electrode lines and the data lines are spatially separated, the signal coupling between the common electrode lines and the data lines is reduced, the problem of horizontal crosstalk is solved, and the display effect is improved.

18 Claims, 4 Drawing Sheets

DISPLAY PANEL AND DISPLAY DEVICE COMPRISING THE SAME

CROSS-REFERENCE TO RELATED APPLICATIONS

This application claims the benefit of Chinese Patent Application No. 202310191318.1, entitled DISPLAY PANEL AND DISPLAY DEVICE, which was filed with China National Intellectual Property Administration on Mar. 2, 2023, and the entire contents of which are incorporated herein by reference.

TECHNICAL FIELD

The present disclosure relates to the field of display technology, in particular to a display panel and a display device.

BACKGROUND

Conventional structure of a display panel is mainly composed of an array substrate, liquid crystal layers and a color film substrate. The color film substrate is composed of a BM shading layer, a RGB color resistance layer and first common electrode lines CVCOM. The array substrate is composed of subpixel arrays. Second common electrode lines AVCOM of the subpixels and the pixel electrodes form a storage capacitors, and the pixel electrodes and the first common electrode lines CVCOM form pixel liquid crystal capacitors, to drive the liquid crystal layers to rotate.

Further, data lines and scan lines are provided on the array substrate. The data lines, the scan lines and the second common electrode lines adopt metal wires as conducting lines to transmit electrical signals. Because of the close contact between different metal wires or the presence of a medium therebetween, capacitors would be formed and interacted with each other. A changing signal on one kind of metal wire will be coupled to an electrical signal on another kind of metal wire to change. In particular, when a data signal on a data line changes, the coupled common electrode voltage signal on a second common electrode line would fluctuate, resulting in horizontal crosstalk, which affects the display effect of the display panel.

SUMMARY

The purpose of this disclosure is to provide a display panel, which is intended to solve the problem of horizontal crosstalk caused by the mutual coupling interference of different kinds of signal lines in the traditional display panel.

A first aspect of the embodiments of this disclosure provides a display panel including a color film substrate, liquid crystal layers and an array substrate layered successively in a first direction;
the array substrate includes multiple columns of first data lines, multiple rows of first scan lines and a first pixel array, the first pixel array includes first pixel units arranged in an array; the first pixel units include first pixel electrodes and first thin film transistors, each of first pixel electrodes is connected with one of the first data lines and with one of the first scan lines respectively through one of the first thin film transistors; the array substrate further includes multiple columns of first common electrode lines, and one of the first common electrode lines and one of the first data lines are arranged respectively on two sides of one of the first pixel electrodes;
the color film substrate includes multiple columns of second data lines, multiple rows of second scan lines and a second pixel array, the second pixel array includes second pixel units arranged in an array; the second pixel units include second pixel electrodes and second thin film transistors, each of the second pixel electrodes is connected with one of the second data lines and with one of the second scan lines respectively through one of the second thin film transistors; the color film substrate further includes multiple columns of second common electrode lines, and one of the second common electrode lines and one of the second data lines are arranged respectively on two sides of one of the second pixel electrodes; and
along a second direction, the first pixel electrodes arranged in columns and the second pixel electrodes arranged in columns alternate with each other at spatial intervals, and one of the first common electrode lines and one of the second common electrode lines are spatially arranged adjacent to each other, one of the first data lines and one of the second data lines are spatially arranged adjacent to each other, and the first direction and the second direction intersect each other.

Optionally, the array substrate further includes multiple first color resistances arranged in an array, and the respective first color resistances are arranged corresponding to the respective second pixel electrodes;
the color film substrate further includes multiple second color resistances arranged in an array, and the respective second color resistances are arranged corresponding to the respective first pixel electrodes; and
the respective columns of first color resistances and the respective columns of second color resistances alternate with each other at intervals along the second direction.

Optionally, the array substrate further includes multiple first color resistances arranged in an array, and the respective first color resistances are layered on the respective first pixel electrodes and arranged corresponding to the respective second pixel electrodes; or
the color film substrate further includes multiple second color resistances arranged in an array, and the respective second color resistances are layered on the respective second pixel electrodes and arranged corresponding to the respective first pixel electrodes.

Optionally, adjacent first color resistances or second color resistances are respectively a red color resistance, a green color resistance and a blue color resistance.

Optionally, a number of the first scan lines and a number of the second scan lines are equal, and an $i^{th}$ row of a first scan line and an $i^{th}$ row of a second scan line receive a same row HIGH signal.

Optionally, the $i^{th}$ row of the first scan line does not overlap with the $i^{th}$ row of the second scan line in the first direction.

Optionally, the first pixel electrode partially overlaps with an adjacent one of the first common electrode lines to form a storage capacitor, and form a liquid crystal capacitor with a correspondingly arranged one of the second common electrode lines; and
the second pixel electrode partially overlaps with an adjacent one of the second common electrode lines to form a storage capacitor, and form a liquid crystal capacitor with a correspondingly arranged one of the first common electrode lines.

Optionally, the first common electrode lines and the second common electrode lines receive common electrode voltage signals of same voltage value.

Optionally, the array substrate further includes a first substrate, and the first scan lines, the first data lines and the first common electrode lines are correspondingly layered on the first substrate; and the color film substrate further includes a second substrate, and the second scan lines, the second data lines and the second common electrode lines are correspondingly layered on the second substrate.

A second aspect of the embodiments of this disclosure provides a display device including a backlight module, a display panel drive circuitry and the above-mentioned display panel, and the display panel drive circuitry is correspondingly connected with the display panel, and the backlight module is disposed opposite to the display panel.

The beneficial effects of the embodiments of this disclosure over the prior art are: the above-mentioned display panel includes an array substrate, liquid crystal layers and a color film substrate; the array substrate includes multiple columns of first data lines, multiple rows of first scan lines, a first pixel array and multiple columns of first common electrode lines; the color film substrate includes multiple columns of second data lines, multiple rows of second scan lines, a second pixel array and multiple columns of second common electrode lines; by arranging the pixel units, the data lines, the scan lines and the common electrode lines respectively and alternatingly on the array substrate and on the color film substrate, the common electrode lines and the data lines are spatially separated, the signal coupling between the common electrode lines and the data lines is reduced, the problem of horizontal crosstalk is solved, and the display effect is improved.

Figure 1:
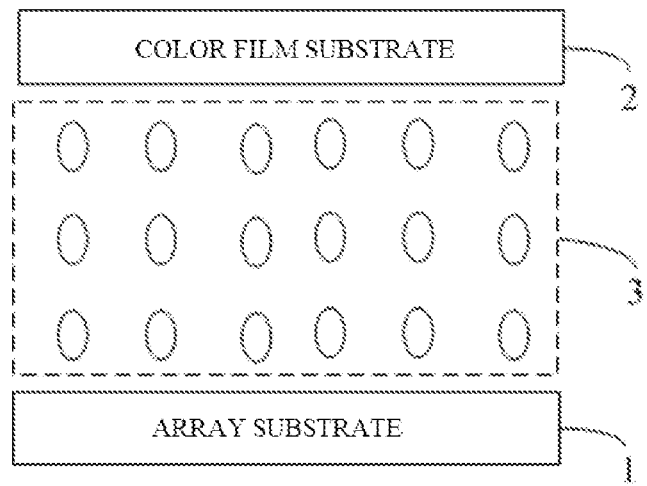
FIG. 1 is a schematic diagram of a first structure of a display panel provided in a first embodiment of this disclosure.

Reference numbers in the drawings are as follows:

100—display panel, 200—display panel drive circuitry, 300—backlight module, 1—array substrate, 2—color film substrate, 3—liquid crystal layer, 11—first data line, 12—first scan line, 13—first pixel electrode, 14—first thin film transistor, 15—first common electrode line, 16—first color resistance, 17—first substrate, 21—second data line, 22—second scan line, 23—second pixel electrode, 24—second thin film transistor, 25—second common electrode line, 26—second color resistance, 27—second substrate.

DETAILED DESCRIPTION OF THE EMBODIMENTS

To make the technical problems to be solved, technical solutions and beneficial effects in this disclosure more clear, the disclosure is further described in detail in combination with the accompanying drawings and embodiments. It should be understood that the specific embodiments described herein are intended only to explain this disclosure rather than limit the disclosure.

It is understood that the orientation or positional relationship indicated by the terms "length", "width", "upper", "lower", "front", "back", "left", "right", "vertical", "horizontal", "top", "bottom", "inside", "outside", etc. are based on the orientation or positional relationship shown in the accompanying drawings, which are intended only to facilitate and simplify the description of the disclosure, not to indicate or imply that the equipment or components referred to must have a particular orientation, be constructed and operate in a particular orientation, and therefore are not to be construed as limiting the disclosure.

In addition, the terms "first", "second" are used only for description and are not to be construed as indicating or suggesting relative importance or implying the number of technical features indicated. Thus, a feature defined by "first" or "second" may explicitly or implicitly include one or more of the features. In the description of this disclosure, "multiple" means two or more unless otherwise expressly specified.

First Embodiment

A first aspect of the embodiments of this disclosure provides a display panel 100. As shown in FIG. 1, the display panel 100 includes a color film substrate 2, liquid crystal layers 3 and an array substrate 1 layered successively in a first direction. Liquid crystal capacitors are formed between the corresponding pixel electrodes and common electrodes on the color film substrate 2 and the array substrate 1, and drive the liquid crystal layers 3 to rotate, and display corresponding image information in conjunction with the color resistance layer.

Figure 2:
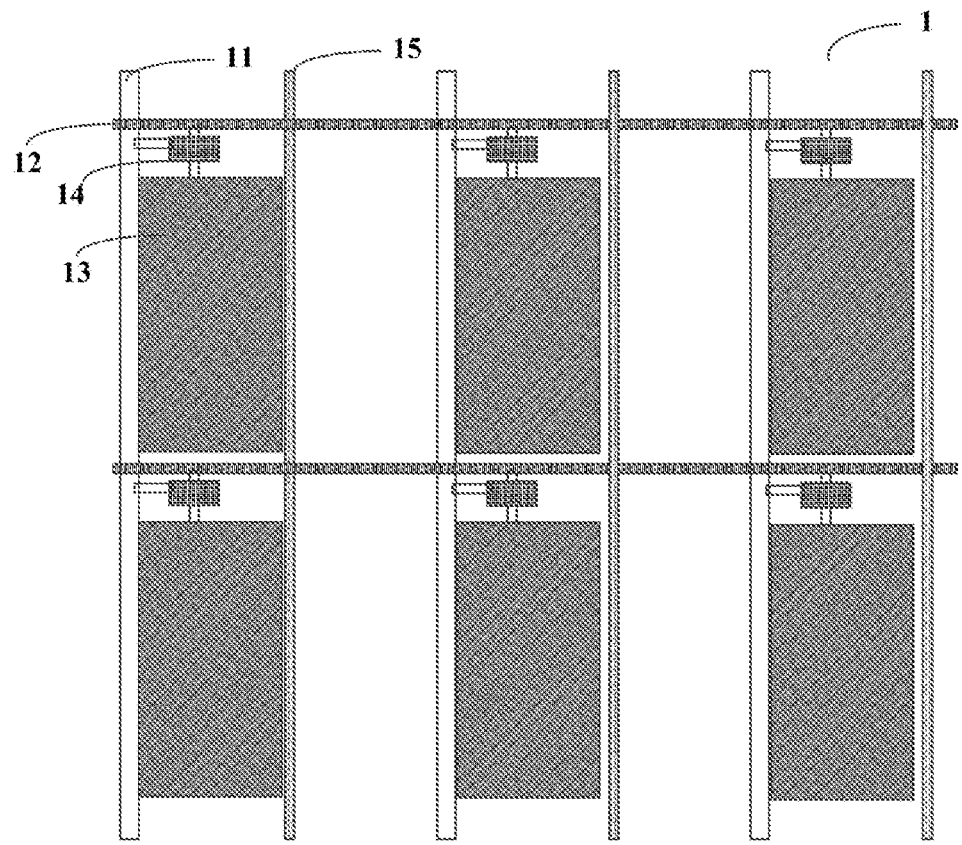
FIG. 2 is a schematic structure diagram of an array substrate provided in the first embodiment of this disclosure.

As shown in FIG. 2, the array substrate 1 includes multiple columns of first data lines 11, multiple rows of first scan lines 12 and a first pixel array. The first pixel array includes first pixel units arranged in an array. Each first pixel unit includes a first pixel electrode 13 and a first thin film transistor 14. Each first pixel electrode 13 is connected with one first data line 11 and with one first scan line 12 respectively through a first thin film transistor 14. The first data lines 11 are used for inputting data signals of corresponding polarities, and the first scan lines 12 are used for inputting row HIGH and row LOW signals row by row. When a row HIGH signal is input, a correspondingly connected first thin film transistor 14 is turned on and input a data signal to a first pixel electrode 13. And a liquid crystal capacitor is formed between the first pixel electrode 13 and a common electrode arranged on the color film substrate 2, and drive the liquid crystals at corresponding positions to rotate, and display corresponding image information in conjunction with the color resistance layer.

In this case, the first thin film transistors 14 are connected to the data lines, the scan lines and the pixel electrodes through conductive structures. The conductive structures may be conductive films or metal wires.

The array substrate 1 further includes multiple columns of first common electrode lines 15. One first common electrode line 15 and one first data line 11 are arranged respectively on two sides of one first pixel electrode 13, and a storage capacitor is formed between the first pixel electrode 13 and an adjacent first common electrode line 15. At the same time, the multiple columns of first data lines 11 and the multiple columns of first common electrode lines 15 alternate with each other along a second direction. That is, they are arranged along the second direction in order from the first column of first data line 11, the first column of first common electrode line 15, the second column of first data line 11, the second column of first common electrode line 15 up to the $n^{th}$ column of first data line 11, the $n^{th}$ column of first common electrode line 15.

Figure 3:
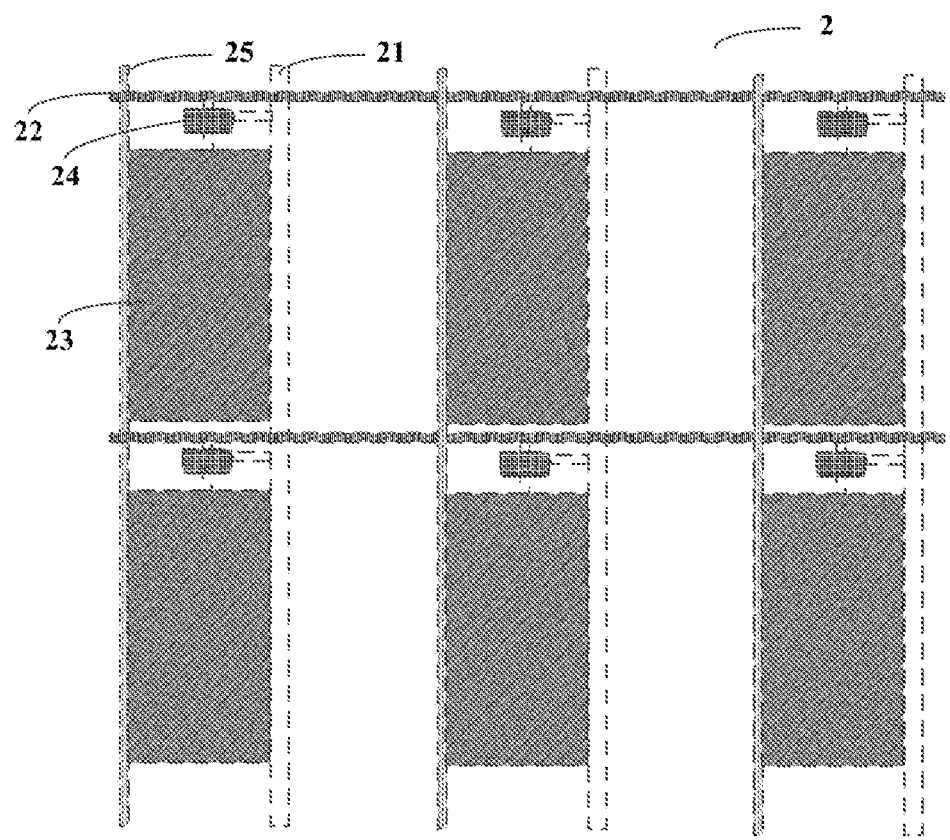
FIG. 3 is a schematic structure diagram of a color film substrate provided in the first embodiment of this disclosure.

As shown in FIG. 3, the color film substrate 2 includes multiple columns of second data lines 21, multiple rows of second scan lines 22 and a second pixel array. The second pixel array includes second pixel units arranged in an array. Each second pixel unit includes a second pixel electrode 23 and a second thin film transistor 24. Each second pixel electrode 23 is connected with one second data line 21 and with one second scan line 22 respectively through a second thin film transistor 24. The second data lines 21 are used for inputting data signals of corresponding polarities, and the second scan lines 22 are used for inputting row HIGH and row LOW signals row by row. When a row HIGH signal is input, a correspondingly connected second thin film transistor 24 is turned on and input a data signal to a second pixel electrode 23. And a liquid crystal capacitor is formed between the second pixel electrode 23 and a common electrode arranged on the array substrate 1, and drive the liquid crystals at corresponding positions to rotate, and display corresponding image information in conjunction with the color resistance layer.

The color film substrate 2 further includes multiple columns of second common electrode lines 25. One second common electrode line 25 and one second data line 21 are arranged respectively on two sides of one second pixel electrode 23, and a storage capacitor is formed between the second pixel electrode 23 and an adjacent second common electrode line 25. At the same time, the multiple columns of second data line 21 and the multiple columns of second common electrode lines 25 alternate with each other along the second direction. That is, they are arranged along the second direction in order from the first column of second data line 21, the first column of second common electrode line 25, the second column of second data line 21, the second column of second common electrode line 25 up to the $n^{th}$ column of second data line 21, the $n^{th}$ column of second common electrode line 25.

Figure 4:
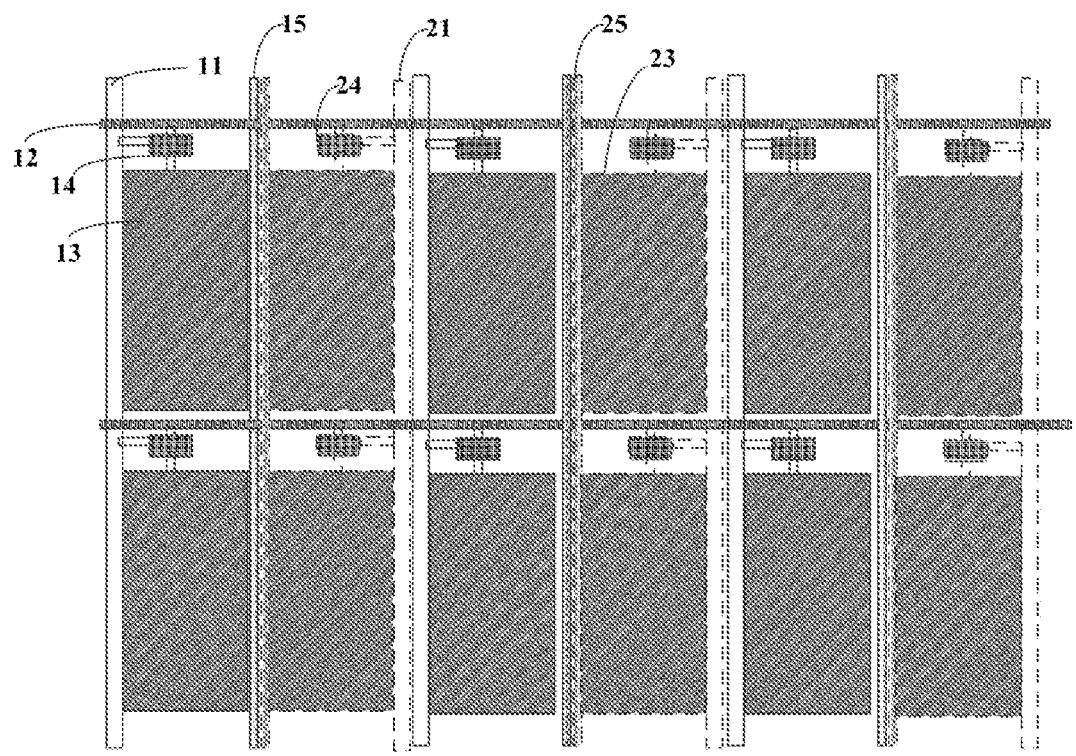
FIG. 4 is a schematic diagram of a second structure of the display panel provided in the first embodiment of this disclosure.

At the same time, in order to reduce the coupling crosstalk between the common electrode lines and the data lines, and reduce the horizontal crosstalk, as shown in FIG. 4, along the second direction, the columns of first pixel electrodes 13 and the columns second pixel electrodes 23 alternate with each other at spatial intervals. Besides, one first common electrode line 15 and one second common electrode line 25 are spatially arranged adjacent to each other, one first data line 11 and one second data line 21 are spatially arranged adjacent to each other, and the first direction and the second direction intersect each other.

That is, seen from the first direction, the columns of first pixel electrodes 13 and the columns of second pixel electrodes 23 are spread and arranged to alternate with each other along the second direction. At the same time, adjacent first common electrode line 15 and second common electrode line 25 are arranged between adjacent first pixel electrode 13 and second pixel electrode 23; or adjacent first data line 11 and second data line 21 are arranged between adjacent first pixel electrode 13 and second pixel electrode 23. For example, as shown in FIG. 4, the adjacent first common electrode line 15 and second common electrode line 25 are arranged between the first column of first pixel electrode 13 and the first column of second pixel electrode 23, and the adjacent first data line 11 and second data line 21 are arranged between the first column of second pixel electrode 23 and the second column of first pixel electrode 13. In this way, relatively appropriate planar or spatial distance will be maintained between the common electrode lines and the data lines in the first direction and/or the second direction, and the coupling between the signals transmitted over them is reduced. That is, when a data signal on the first data lines 11 and/or the second data lines 21 changes, the common electrode voltage signal on the first common electrode lines 15 and/or the second common electrode lines 25 will not fluctuate, and no horizontal crosstalk will be resulted, which improves the display effect of the display panel 100.

At the same time, to further realize synchronously transmitting signals to the respective electrodes of a same row which are overlapped spatially, to make the pixel units in the same row operate simultaneously, optionally, the number of the first scan lines 12 and the second scan lines 22 are equal, and the $i^{th}$ row of first scan line 12 and the $i^{th}$ row of second scan line 22 receive a same row HIGH signal.

That is, the number of rows of first scan lines 12 arranged on the array substrate 1 is equal to the number of rows of second scan lines 22 provided on the color film substrate 2, and the two corresponding lines (i.e., the first scan line 12 and the second scan line 22) of a same row transmit a same row HIGH signal. For example, at a first moment, the first row of first scan line 12 and the first row of second scan line 22 input the same row HIGH signal, and the first thin film transistors 14 of the first row of pixel units and the second thin film transistors 24 of the first row of second pixel units connected thereto are turned on. The first row of first pixel electrodes 13 and the first row of second pixel electrodes 23 obtain data signals of corresponding positive and negative polarities through the first data line 11 and the second data line 21 arranged on both sides of the two pixel units, and form liquid crystal capacitors with corresponding common electrodes, and display corresponding image information in conjunction with the color resistance layer.

And at a next moment, the first row of first scan line 12 and the first row of second scan line 22 input a same row LOW signal, the second row of first scan line 12 and the second row of second scan line 22 input a same row HIGH signal, and the first thin film transistors 14 of the second row of first pixel units and the second thin film transistors 24 of the second row of second pixel units are turned on. The second row of first pixel electrodes 13 and the second row of second pixel electrode 23 obtain data signals of corresponding positive and negative polarities through the first data line 11 and the second data line 21 arranged on both sides of the two pixel units, and form liquid crystal capacitors with corresponding common electrodes, and display corresponding image information in conjunction with the color resistance layer; and so on until the last row of first scan line 12 and the last row of second scan line 22 input the row HIGH signal. Therefore, the respective rows of pixel units may be turned on and driven row by row, to display corresponding image information.

In this case, the first scan line 12 and the second scan line 22 of a same row may spatially overlap or not overlap. For example, as shown in FIG. 4, the first scan lines 12 and the second scan lines 22 are overlapped. Further, to reduce the arranged shading layers, the data lines, the scan lines and the common electrode lines may be used for shading light. To improve the shading effect, adjacent first data line 11 and second data line 21 do not spatially overlap, and adjacent first common electrode line 15 and second common electrode line 25 do not spatially overlap. Also, optionally, along the first direction, the $i^{th}$ row of first scan line 12 does not overlap with the $i^{th}$ row of second scan line 22. The metal wires of the respective data lines, scan lines and common electrode lines fill the gaps between the pixel electrodes, which improves the shading effect, simplifies the manufacturing process of the display panel 100 and reduces the design cost.

Further, common electrode lines CVCOM are arranged in the color film substrate 2 of the original display panel 100, and form liquid crystal capacitors with the pixel electrodes on the array substrate 1. In order to realize the structure of the liquid crystal capacitor, the color film substrate 2 and the array substrate 1 may also be provided with respective common electrode lines for forming the liquid crystal capacitor, which may form liquid crystal capacitors with the pixel electrodes on the array substrate 1 or the color film substrate 2. That is, a group of common electrode lines CVCOM are arranged on the array substrate 1 at positions corresponding to the first column of second pixel electrodes 23 on the array substrate 2, and another group of common electrode lines CVCOM are arranged on the color film substrate 2 at positions corresponding to the first column of first pixel electrodes 13 on the array substrate 1, so as to form corresponding liquid crystal capacitor structures with the respective first pixel electrodes 13 and second pixel electrodes 23.

Further, to reduce the process and improve the aperture ratio, in this embodiment, there is no need to arrange an additional common electrode line CVCOM, but the original first common electrode lines 15 and second common electrode lines 25 are used as the common electrode lines CVCOM, and form liquid crystal capacitors with the second pixel electrodes 23 and the first pixel electrodes 13 at corresponding positions. That is, optionally, a first pixel electrode 13 may partially overlap with an adjacent first common electrode line 15 to form a storage capacitor, and form a liquid crystal capacitor with a correspondingly arranged second common electrode line 25.

A second pixel electrode 23 may partially overlap with an adjacent second common electrode line 25 to form a storage capacitor, and form a liquid crystal capacitor with an arranged first common electrode line 15.

For example, as shown in FIG. 4, the pixel electrode 13 in the first column and first row partially overlaps with the adjacent first column of first common electrode line 15 to form a memory capacitor, and simultaneously forms a liquid crystal capacitor with the correspondingly arranged first column of second common electrode line 25. In case where the pixel electrode 13 in the first column and first row inputs a data signal, the data signal forms a driving voltage of a corresponding positive/negative polarity with the first column second common electrode line 25, and drives a liquid crystal at a corresponding position in the liquid crystal layer 3 to rotate, and displays a corresponding image information in conjunction with the color resistance layer.

Alternatively, as shown in FIG. 3, the second pixel electrode 23 in the first column and first row partially overlaps with the adjacent first column second common electrode line 25 to form a memory capacitor, and simultaneously forms a liquid crystal capacitor with the correspondingly arranged first column of first common electrode line 15. In case where the second pixel electrode 23 in the first column and first row inputs a data signal, the data signal forms a driving voltage of a corresponding positive/negative polarity with the first column of first common electrode line 15, and drives a liquid crystal at a corresponding position in the liquid crystal layer 3 to rotate, and displays a corresponding image information in conjunction with the color resistance layer.

At the same time, in case where the first common electrode lines 15 and the second common electrode lines 25 are used to replace the common electrode lines CVCOM on the original color film substrate 2, in order to ensure that each data signal has a same reference potential so that a correct matching display effect may be obtained when different frames display changes, optionally, the first common electrode lines 15 and the second common electrode lines 25 receive common electrode voltage signals of same voltage value. That is, the respective first pixel electrodes 13 and second pixel electrodes 23 have a same reference potential when inputting corresponding data signals, which improves the effect of display panel 100. At the same time, by making the first common electrode lines 15 and the second common electrode lines 25 arranged on the array substrate 1 and the color film substrate 2 to receive the same common electrode voltage signal, the interference of the first scan lines 12 and the second scan lines 22 on the first pixel electrodes 13 and the second pixel electrodes 23 may be shielded in the second direction, which further improves the display effect of the display panel 100.

The beneficial effects of the embodiment of this disclosure over the prior art are: the above-mentioned display panel 100 includes an array substrate 1, liquid crystal layers 3 and a color film substrate 2; the array substrate 1 includes multiple columns of first data lines 11, multiple rows of first scan lines 12, a first pixel array and multiple columns of first common electrode lines 15; the color film substrate 2 includes multiple columns of second data lines 21, multiple rows of second scan lines 22, a second pixel array and multiple columns of second common electrode lines 25; by arranging the pixel units, the data lines, the scan lines and the common electrode lines respectively and alternatingly on the array substrate 1 and on the color film substrate 2, the common electrode lines and the data lines are spatially separated, the signal coupling between the common electrode lines and the data lines is reduced, the problem of horizontal crosstalk is solved, and the display effect is improved.

Second Embodiment

Figure 5:
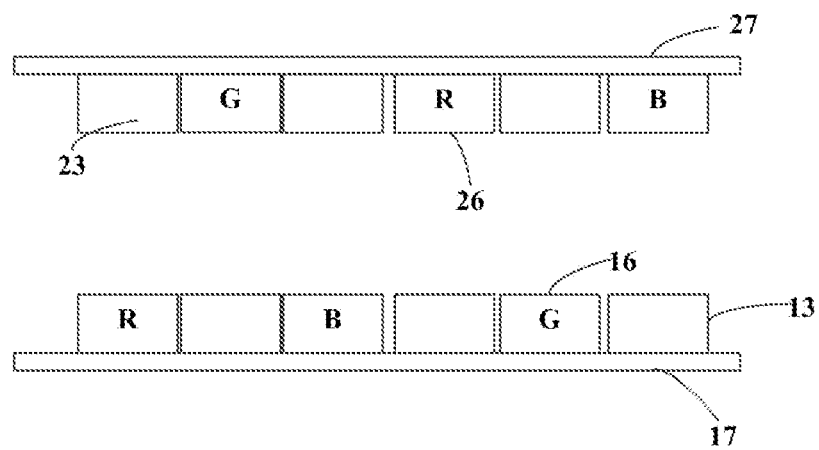
FIG. 5 is a schematic structure diagram of a display panel provided in a second embodiment of this disclosure.

To realize the image display of the display panel 100, a color resistance layer is also provided in the display panel 100, as shown in FIG. 5. In an optional embodiment, the array substrate 1 further includes multiple first color resistances 16 arranged in an array, and the respective first color resistances 16 are arranged corresponding to the respective second pixel electrodes 23;

The color film substrate 2 further includes multiple second color resistances 26 arranged in an array, and the respective second color resistances 26 are arranged corresponding to the respective first pixel electrodes 13;

The respective columns of first color resistances 16 and the respective columns of second color resistances 26 alternate with each other at intervals along the second direction.

In this embodiment, each first color resistance 16 is arranged between two first pixel electrodes 13, and each second color resistance 26 is arranged between two second pixel electrodes 23. When liquid crystal capacitors are formed between the first pixel electrodes 13 and the correspondingly arranged second common electrode lines 25, the liquid crystals between the first pixel electrodes 13 and the correspondingly arranged second color resistances 26 are driven to rotate for lights of different size to pass through, and output image information of corresponding colors through the second color resistances 26.

Similarly, when the liquid crystal capacitors are formed between the second pixel electrodes 23 and the correspondingly arranged first common electrode lines 15, the liquid crystals between the second pixel electrodes 23 and the correspondingly arranged first color resistances 16 are driven to rotate for lights of different size to pass through, and output image information of corresponding colors through the first color resistances 16.

Spatially, the first color resistances 16 and the second color resistances 26 alternate with each other. That is, the first column of first color resistances 16, the first column of second color resistances 26, the second column of second color resistances 16, the second column of second color resistances 26 and so on are spatially arranged in order.

Third Embodiment

Figure 6:
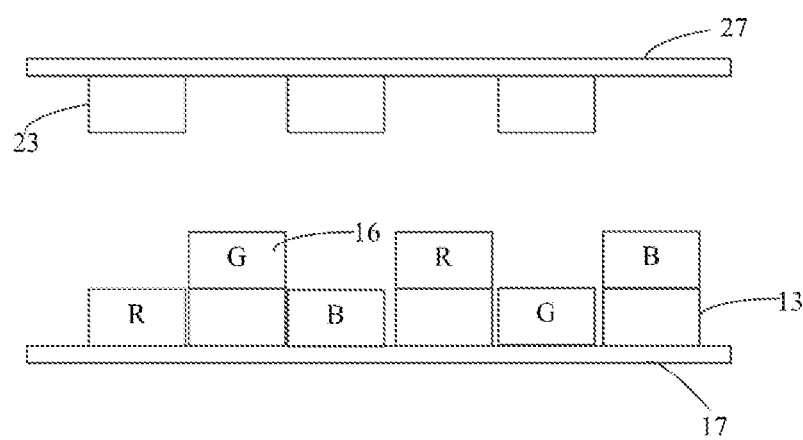
FIG. 6 is a schematic diagram of a first structure of a display panel provided in a third embodiment of this disclosure.
Figure 7:
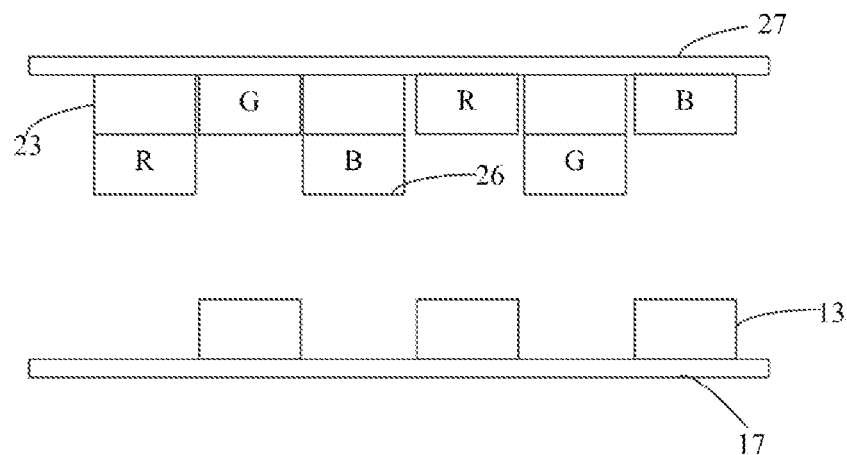
FIG. 7 is a schematic diagram of a second structure of the display panel provided in the third embodiment of this disclosure.

In another optional embodiment, as shown in FIG. 6, the array substrate 1 further includes multiple first color resistances 16 arranged in an array, and the respective first color resistances 16 are layered on the respective first pixel electrodes 13 and arranged corresponding to the respective second pixel electrodes 23;

Alternatively, as shown in FIG. 7, the color film substrate 2 further includes multiple second color resistances 26 arranged in an array, and the respective second color resistances 26 are layered on the respective second pixel electrodes 23 and arranged corresponding to the respective first pixel electrodes 13.

In this embodiment, in order to simplify the manufacturing process, the color resistance layer is arranged on a same substrate. That is, all the first color resistances 16 are arranged on the array substrate 1 and corresponding to the first pixel electrodes 13 and the second pixel electrodes 23; or all the second color resistances 26 are arranged on the color film substrate 2 and corresponding to the first pixel electrodes 13 and the second pixel electrodes 23.

For example, as shown in FIG. 6, in case where the color resistances are arranged on the array substrate 1, when liquid crystal capacitors are formed between the first pixel electrodes 13 and the correspondingly arranged second common electrode lines 25, liquid crystals between the first pixel electrodes 13 and the correspondingly arranged second common electrode lines 25 are driven to rotate for lights of different size to pass through, and output image information of corresponding colors through the first color resistances 16. Similarly, when the liquid crystal capacitors are formed between the second pixel electrodes 23 and the correspondingly arranged first common electrode lines 15, the liquid crystals between the second pixel electrodes 23 and the correspondingly arranged first common electrode lines 15 are driven to rotate for lights of different size to pass through, and output image information of corresponding colors through the first color resistances 16.

Alternatively, as shown in FIG. 7, in case where the color resistances are arranged on the color film substrate 2, when liquid crystal capacitors are formed between the first pixel electrodes 13 and the correspondingly arranged second common electrode lines 25, the liquid crystals between the first pixel electrodes 13 and the correspondingly arranged second common electrode lines 25 are driven to rotate for lights of different size to pass through, and output image information of corresponding colors through the second color resistances 26. Similarly, when the liquid crystal capacitors are formed between the second pixel electrodes 23 and the correspondingly arranged first common electrode lines 15, the liquid crystals between the second pixel electrodes 23 and the correspondingly arranged first common electrode lines 15 are driven to rotate for lights of different size to pass through, and output image information of corresponding colors through the second color resistances 26.

Spatially, the first color resistances 16 and the second color resistances 26 alternate with each other. That is, the first column of first color resistances 16, the first column of second color resistances 26, the second column of first color resistances 16, the second column of second color resistances 26 and so on are spatially arranged in order.

In this case, the color of each color resistance may be set according to the requirements. As shown in FIG. 5 to FIG. 7, optionally, the adjacent first color resistances 16 or second color resistances 26 are spatially respectively a red color resistance, a green color resistance and a blue color resistance.

Further, in order to realize the arrangement of the respective data lines, scan lines, common electrode lines and color resistances, and for a purpose of fixing process, optionally, the array substrate 1 further includes a first substrate 17, and the first scan lines 12, the first data lines 11 and the first common electrode lines 15 are correspondingly layered on the first substrate 17.

The color film substrate 2 further includes a second substrate 27, and the second scan lines 22, the second data lines 21 and the second common electrode lines 25 are correspondingly layered on the second substrate 27.

In this case, the first substrate 17 and the second substrate 27 are transparent substrates. Optionally, the first substrate 17 and the second substrate 27 are glass substrates.

Fourth Embodiment

Figure 8:
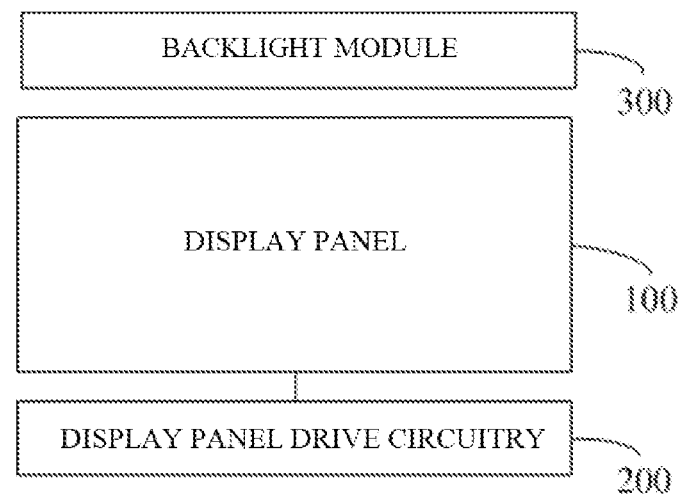
FIG. 8 is a schematic structure diagram of a display device provided in a fourth embodiment of this disclosure.

This disclosure also provides a display device. As shown in FIG. 8, the display device includes a backlight module 300, a display panel drive circuitry 200 and a display panel 100. For the specific structure of the display device, one may refer to the above embodiments. Because this display device adopts all the technical solutions of the above embodiments, the display device has at least all the beneficial effects brought about by the technical solutions of the above embodiments, which will not be repeated here. In this case, the display panel drive circuitry 200 is correspondingly connected with the display panel 100, and the backlight module 300 is disposed opposite to the display panel 100.

In this embodiment, the display panel drive circuitry 200 includes a source drive circuit, a gate driver circuit and a common electrode voltage circuit, and may also include a timing controller and a power management integrated circuit necessary for driving. The timing controller controls the source driver circuit and the gate driver circuit to perform scanning row by row. At the same time, the common electrode voltage circuit obtains the analog voltages output by the power management integrated circuit, and converts the analog voltages into common electrode voltage signals of corresponding voltage values and output the same to the first common electrode lines 15 on the array substrate 1 and to the second common electrode lines 25 on the color film substrate. The common electrode voltage signals on the common electrode lines on the array substrate 1 and on the color film substrate 2 cooperate with the data signals output by the source driver circuit to drive the liquid crystals, and display corresponding image information in conjunction with the backlight module 300.

The above embodiments are merely intended for describing but not for limiting the technical solutions of the present disclosure. Although the present disclosure is described in detail with reference to the above-mentioned embodiments, it should be understood by those skilled in the art that, the technical solutions recited in each of the above-mentioned embodiments may still be modified, or some of or all the technical features may be equivalently replaced, while these modifications or replacements do not make the essence of the corresponding technical solutions depart from the scope of the technical solutions of each of the embodiments of the present disclosure, and should be included in the protection scope of this disclosure.

The invention claimed is:

1. A display panel comprising a color film substrate, liquid crystal layers and an array substrate layered successively in a first direction, wherein:
the array substrate comprises multiple columns of first data lines, multiple rows of first scan lines and a first pixel array; the first pixel array comprises first pixel units arranged in an array; the first pixel units comprise first pixel electrodes and first thin film transistors, each of the first pixel electrodes is connected with one of the first data lines and with one of the first scan lines respectively through one of the first thin film transistors; the array substrate further comprises multiple columns of first common electrode lines, and one of the first common electrode lines and one of the first data lines are arranged respectively on two sides of one of the first pixel electrodes;
the color film substrate comprises multiple columns of second data lines, multiple rows of second scan lines and a second pixel array, the second pixel array comprises second pixel units arranged in an array; the second pixel units comprise second pixel electrodes and second thin film transistors, each of the second pixel electrodes is connected with one of the second data lines and with one of the second scan lines respectively through one of the second thin film transistors; the color film substrate further comprises multiple columns of second common electrode lines, and one of the second common electrode lines and one of the second data lines are arranged respectively on two sides of one of the second pixel electrodes;
along a second direction, the first pixel electrodes arranged in columns and the second pixel electrodes arranged in columns alternate with each other at spatial intervals, and one of the first common electrode lines and one of the second common electrode lines are spatially arranged adjacent to each other, one of the first data lines and one of the second data lines are spatially arranged adjacent to each other, and the first direction and the second direction intersect each other;
the first pixel electrode partially overlaps with an adjacent one of the first common electrode lines to form a storage capacitor, and form a liquid crystal capacitor with a correspondingly arranged one of the second common electrode lines; and
the second pixel electrode partially overlaps with an adjacent one of the second common electrode lines to form a storage capacitor, and form a liquid crystal capacitor with a correspondingly arranged one of the first common electrode lines.

2. The display panel according to claim 1, wherein the array substrate further comprises multiple first color resistances arranged in an array, and the respective first color resistances are arranged corresponding to the respective second pixel electrodes;
the color film substrate further comprises multiple second color resistances arranged in an array, and the respective second color resistances are arranged corresponding to the respective first pixel electrodes; and
the respective columns of first color resistances and the respective columns of second color resistances alternate with each other at intervals along the second direction.

3. The display panel according to claim 2, wherein adjacent first color resistances or second color resistances are respectively a red color resistance, a green color resistance and a blue color resistance.

4. The display panel according to claim 1, wherein the array substrate further comprises multiple first color resistances arranged in an array, and the respective first color resistances are layered on the respective first pixel electrodes and arranged corresponding to the respective second pixel electrodes; or
the color film substrate further comprises multiple second color resistances arranged in an array, and the respective second color resistances are layered on the respective second pixel electrodes and arranged corresponding to the respective first pixel electrodes.

5. The display panel according to claim 4, wherein adjacent first color resistances or second color resistances are respectively a red color resistance, a green color resistance and a blue color resistance.

6. The display panel according to claim 1, wherein a number of the first scan lines and a number of the second scan lines are equal, and an $i^{th}$ row of a first scan line and an $i^{th}$ row of a second scan line receive a same row HIGH signal.

7. The display panel according to claim 6, wherein the $i^{th}$ row of the first scan line does not overlap with the $i^{th}$ row of the second scan line in the first direction.

8. The display panel according to claim 1, wherein the first common electrode lines and the second common electrode lines receive common electrode voltage signals of same voltage value.

9. The display panel according to claim 1, wherein the array substrate further comprises a first substrate, and the first scan lines, the first data lines, and the first common electrode lines are correspondingly layered on the first substrate; and
the color film substrate further comprises a second substrate, and the second scan lines, the second data lines, and the second common electrode lines are correspondingly layered on the second substrate.

10. A display device, comprising a backlight module, a display panel drive circuitry and a display panel, wherein the display panel drive circuitry is correspondingly connected with the display panel, and the backlight module is disposed opposite to the display panel; and the display panel comprises a color film substrate, liquid crystal layers and an array substrate layered successively in a first direction, wherein:

the array substrate comprises multiple columns of first data lines, multiple rows of first scan lines and a first pixel array; the first pixel array comprises first pixel units arranged in an array; the first pixel units comprises first pixel electrodes and first thin film transistors, each of the first pixel electrodes is connected with one of the first data lines and with one of the first scan lines respectively through one of the first thin film transistors; the array substrate further comprises multiple columns of first common electrode lines, and one of the first common electrode lines and one of the first data lines are arranged respectively on two sides of one of the first pixel electrodes;

the color film substrate comprises multiple columns of second data lines, multiple rows of second scan lines and a second pixel array, the second pixel array comprises second pixel units arranged in an array; the second pixel units comprises second pixel electrodes and second thin film transistors, each of the second pixel electrodes is connected with one of the second data lines and with one of the second scan lines respectively through one of the second thin film transistors; the color film substrate further comprises multiple columns of second common electrode lines, and one of the second common electrode lines and one of the second data lines are arranged respectively on two sides of one of the second pixel electrodes;

along a second direction, the first pixel electrodes arranged in columns and the second pixel electrodes arranged in columns alternate with each other at spatial intervals, and one of the first common electrode lines and one of the second common electrode lines are spatially arranged adjacent to each other, one of the first data lines and one of the second data lines are spatially arranged adjacent to each other, and the first direction and the second direction intersect each other;

the first pixel electrode partially overlaps with an adjacent one of the first common electrode lines to form a storage capacitor, and form a liquid crystal capacitor with a correspondingly arranged one of the second common electrode lines; and the second pixel electrode partially overlaps with an adjacent one of the second common electrode lines to form a storage capacitor, and form a liquid crystal capacitor with a correspondingly arranged one of the first common electrode lines.

11. The display device according to claim 10, wherein the array substrate further comprises multiple first color resistances arranged in an array, and the respective first color resistances are arranged corresponding to the respective second pixel electrodes;

the color film substrate further comprises multiple second color resistances arranged in an array, and the respective second color resistances are arranged corresponding to the respective first pixel electrodes; and the respective columns of first color resistances and the respective columns of second color resistances alternate with each other at intervals along the second direction.

12. The display device according to claim 11, wherein adjacent first color resistances or second color resistances are respectively a red color resistance, a green color resistance and a blue color resistance.

13. The display device according to claim 10, wherein the array substrate further comprises multiple first color resistances arranged in an array, and the respective first color resistances are layered on the respective first pixel electrodes and arranged corresponding to the respective second pixel electrodes; or the color film substrate further comprises multiple second color resistances arranged in an array, and the respective second color resistances are layered on the respective second pixel electrodes and arranged corresponding to the respective first pixel electrodes.

14. The display device according to claim 13, wherein adjacent first color resistances or second color resistances are respectively a red color resistance, a green color resistance and a blue color resistance.

15. The display device according to claim 10, wherein a number of the first scan lines and a number of the second scan lines are equal, and an $i^{th}$ row of a first scan line and an $i^{th}$ row of a second scan line receive a same row HIGH signal.

16. The display device according to claim 15, wherein the $i^{th}$ row of the first scan line does not overlap with the $i^{th}$ row of the second scan line in the first direction.

17. The display device according to claim 10, wherein the first common electrode lines and the second common electrode lines receive common electrode voltage signals of same voltage value.

18. The display device according to claim 10, wherein the array substrate further comprises a first substrate, and the first scan lines, the first data lines, and the first common electrode lines are correspondingly layered on the first substrate; and the color film substrate further comprises a second substrate, and the second scan lines, the second data lines, and the second common electrode lines are correspondingly layered on the second substrate.

* * * * *